United States Patent [19]

Yoshimoto et al.

[11] Patent Number: 4,613,907
[45] Date of Patent: Sep. 23, 1986

[54] FACSIMILE RECEIVER

[75] Inventors: Yoshio Yoshimoto, Aichi; Michiyoshi Washio, Shiga; Chikayoshi Yazaki, Kyoto, all of Japan

[73] Assignee: Murata Giken Kabushiki Kaisha, Kyoto, Japan

[21] Appl. No.: 638,724

[22] Filed: Aug. 8, 1984

[30] Foreign Application Priority Data

Aug. 10, 1983 [JP] Japan .................................. 58-146990

[51] Int. Cl.[4] .............................................. H04N 1/32
[52] U.S. Cl. .................................... 358/257; 358/280; 355/145 H
[58] Field of Search ........................ 358/256, 257, 280; 355/145 H

[56] References Cited

U.S. PATENT DOCUMENTS 4,419,697 12/1983 Wada .................................. 358/257

Primary Examiner—James J. Groody
Assistant Examiner—Edward L. Coles
Attorney, Agent, or Firm—Spensley Horn Jubas & Lubitz

[57] ABSTRACT

A facsimile receiver provides with confirmation means whether or not there exists transmission mistake at the transmitter side. As soon as receiving of the picture information is finished, receiving person display data representing a division of receiving the picture information, data of representing the day and hour of the receiving and the number of received sheets are transmitted automatically as receipt information to the transmitter.

3 Claims, 9 Drawing Figures

FIG. 3

TRANSMITTER            RECEIVER

← D I S
→ D C S
→ TRAINING + TCF
← C F R

→ TRAINING PICTURE INFORMATION R T C

→ M P S
← M C F

→ TRAINING PICTURE INFORMATION R T C

⋮

→ TRAINING PICTURE INFORMATION R T C

→ E O M
← M C F
← D I S
→ (NSC) DTC
← (NSS) DCS
← TRAINING + TCF
→ C F R

← TRAINING RECEIPT R T C

```
'83  07 / 22  10 : 53
ABC COMPANY LIMITED
ACKNOWLEDGE RECEIPT OF PAGE 03
```

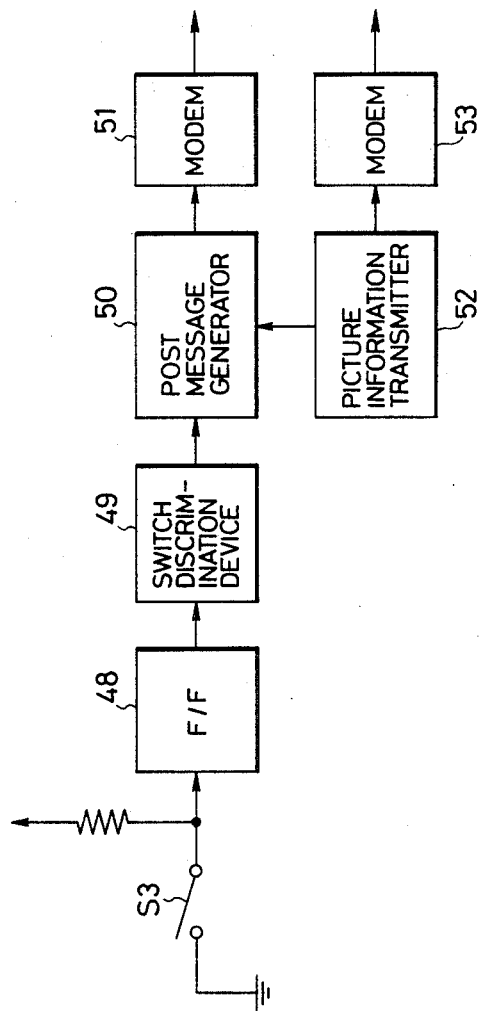

FACSIMILE RECEIVER

BACKGROUND OF THE INVENTION

The present invention relates to a facsimile receiver.

In communication of documents using a facsimile, there is difficulty in confirming whether an original document from the transmitting side has been delivered to the receiving side without any trouble or whether the transmission is performed certainly. Therefore the confirmation is usually performed by telephone communication. In automatic communication, however, since there is no suitable confirmation means, trouble may occur frequently.

SUMMARY OF THE INVENTION

An object of the present invention is to provide a facsimile receiver provided with confirmation means for automatically confirming whether or not there exists a transmission mistake at the transmitter side.

According to the present invention, as soon as receiving of the picture information is finished, receiving person display data representing a division of receiving the picture information, data representing the day and hour of the receiving and data representing the number of received sheets are transmitted automatically as receipt information to the transmitter. Confirmation can thereby be easily performed regarding whether or not there exists a transmission mistake at the transmitter side. Storage of the receipt is possible by printing the receipt information at the transmitter. The working state of the facsimile may be confirmed at a glance. Consequently the apparatus of the invention can be utilized effectively and conveniently.

Other objects, features and advantages of the invention will be apparent from the following description taken in connection with the accompanying drawings.

BRIEF DESCRIPTION OF DRAWINGS

FIG. 3 is a diagram illustrating procedure of facsimile communication according to the invention;

FIG. 4 is a diagram showing an example of receipt;

FIG. 8 is a block diagram showing a device for changing state of requesting the receipt information and state of not requesting it in the transmitter.

DETAILED DESCRIPTION OF THE INVENTION

Figure 1:
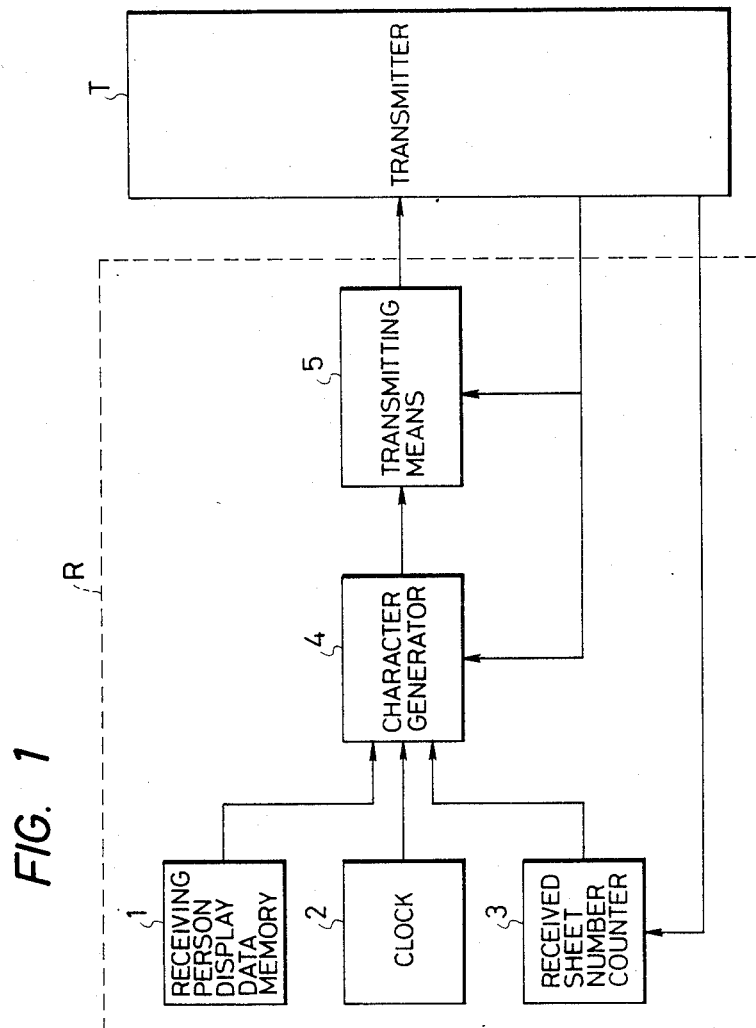
FIG. 1 is a block diagram illustrating constitution of the invention.

A construction of the invention is shown in FIG. 1.

In the figure, T represents a facsimile transmitter and R represents a receiver thereof, and both are in communication state by G II mode. Reference numeral 1 designates a receiving person display data memory to store receiving person display data such as a name of company or division where the receiver R is installed. Numeral 2 designates a clock for measuring the day and hour when communciation is performed, and numeral 3 a received sheet number counter for counting the number of picture information transferred from the transmitter T, i.e. the sheet number of received original documents, according to procedure signal between picture signals. Content of above-mentioned means 1, 2, 3 is read by a character generator 4 as soon as the finishing of picture information communication to the transmitter T is confirmed, and the read information is transferred as character pattern signal corresponding to the above content and then encoded and modulated by a transmitting means 5 and transferred on a line to the transmitter T.

The above embodiment will now be described in detail referring to the accompanying drawings.

Figure 2:
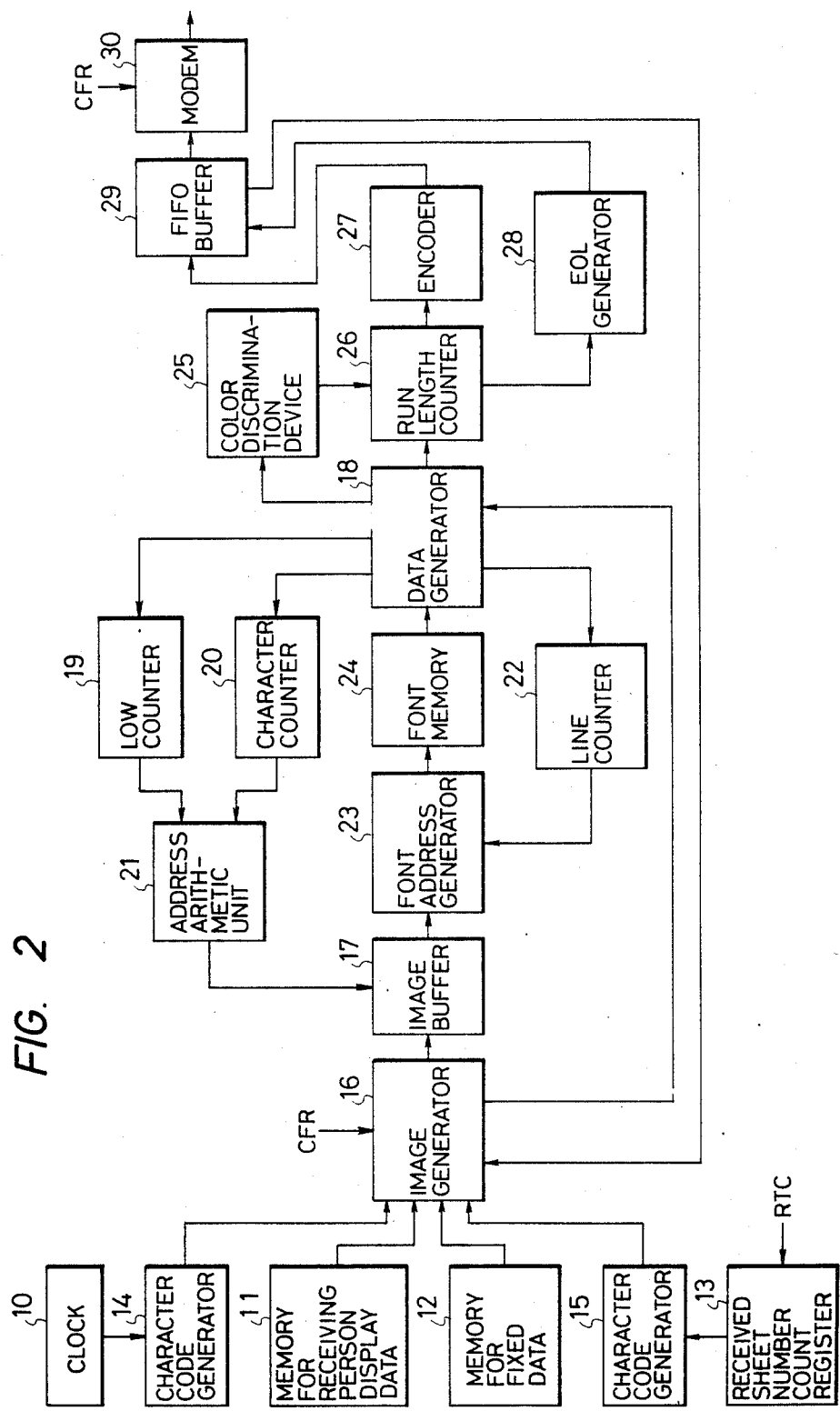
FIG. 2 is a block diagram illustrating an embodiment of the invention.

FIG. 2 shows main part of the facsimile receiver R, and reference numeral 10 designates a clock composed of six counters for counting real values in year, month, day, hour, minute and second, respectively. Numeral 11 designates a memory for receiving person display data where receiving person display data such as a name of a company having the receiver R is stored, numeral 12 a memory for fixed data where the fixed data as hereinafter described is stored, and numeral 13 a received sheet number count register where the number of picture information in communication is counted according to picture information end signal (RTC) transferred from the transmitter T during communication of the picture information. Numerals 14, 15 designate character code generators to convert data in the clock 10 and the received sheet number count register 13 into character code such as ASCII. Numeral 16 designates an image generator as function of CPU, which acts according to receiving ready state confirmation signal (CFR) at the end of picture information communication, and reads data content in the clock 10, the memory 11 for receiving person display data, the memory 12 for fixed data and the received sheet number counter 13 and transfers it to an image buffer 17 and starts a data generator 18. By the starting, the data generator 18 as part of CPU sets a row counter 19 and a character counter 20, and count values in both counters 19, 20 are processed by an address arithmetic unit 21 to perform the address setting of data in the image buffer 17. The memory 12 for fixed data stores fixed data, such as blank or symbol, in image in order that data in the clock 10, the memory 11 for receiving person display data and the received sheet number count register 13 are formed as prescribed image in the image buffer 17, thus image of writing face of a receipt as hereinafter described is subjected to address modification in character code form and stored in the buffer image 17. Next, according to command of a line counter 22 started by the data generator 18, a font address generator 23 reads the character code stored in the image buffer 17 and converts it into font address corresponding to the character code thereby address setting of a font memory 24 is performed. The font memory 24 generates pattern signal of character corresponding to the font address, and the pattern signal is read by the data generator 18 in sequence and supplied to a color discrimination device 25 and a run length counter 26. The pattern signal performs analysis of each character into a number of picture elements and displays white or black of each picture element in digital form, and the color discrimination device 25 detects the varying point from white to black or from black to white of the picture element and outputs the detecting signal to a run length counter 26. The run length counter 26 counts the pattern signals as picture element train of white or black per line in response to the pattern signal and signal from the color discrimination device 25, and supplies the counted signal to an encoder 27 and detects the end of each line corresponding to the count value so as to start an EOL generator 28. The encoder 27 converts the count value of the run length counter 26 into run length code based on G II standard. The EOL generator 28 outputs the end of each line as line and signal (EOL) in post mode, and outputs of the encoder 27 and the EOL generator 28 are supplied through an FIFO buffer 29 at next stage to a modem 30 alternately and modulated and then transferred on the line.

FIG. 3 is a descriptive diagram showing relation of communication between the transmitter T and the receiver R based on G II mode of CCITT with communication based on the present invention.

Before the communication of picture information, function discrimination signal (DIS) is transferred from the receiver R and receiving instruction (DCS) is from the transmitter T and further training signal and line check signal (TCF) are from the transmitter T and receiving ready state confirmation signal (CFR) is from the receiver R, and then picture information in the first sheet of the original document is transmitted. When the picture information in the first sheet is transmitted, picture information end signal (RTC) is transferred from the transmitter T, and then, if there are plural sheets of the original document, multi page signal (MPS) is transferred from the transmitter T and corresponding thereto message confirmation signal (MCF) is transferred from the receiver R, and subsequently picture information communication of the second sheet of the original document is performed. The picture information end signal (RTC) is transmitted per each sheet of information and following the information, and the received sheet number count register 13 shown in FIG. 2 counts the number of the picture information end signal (RTC) every time it is received. When the communication is performed at auto reverse mode, if the picture information communication of the original document in all sheets is finished, message end signal (EOM) is transmitted from the transmitter T and message confirmation signal (MCF) and receiving command (DIS) are from the receiver R. Transmitting instruction (DTC) is transmitted from the transmitter T at standard state, and non-standard device instruction (NSC) is transmitted before the transmitting instruction (DTC) at non-standard state. Receiving instruction (DCS) is transmitted from the receiver R at standard state, and non-standard device setting (NSS) is transmitted from the receiving instruction (DCS) at non-standard state. The training signal and line check signal (TCF) are transferred from the receiver R and receiving state confirmation signal (CFR) is from the transmitter T, thereby receipt information is transferred from the receiver R. The receipt information means information transferred from the modem 30 as shown in the circuit of FIG. 2. Content of the receipt information is read from the clock 10, the memory 11 for receiving person display data, the memory 12 for fixed data and the received sheet number count register 13, and transferred when the image generator 16 and the modem 30 are started in response to the receiving ready state confirmation signal (CFR). If the communication of receipt information is finished, procedure end signal (EOP) is transferred from the receiver R and message confirmation signal (MCF) is from the transmitter T and further line disconnecting instruction (DCN) is from the receiver R thereby the communication is entirely finished.

FIG. 4 shows an example of writing face of the receipt information received and recorded by receiving system of the transmitter R as hereinafter described. In the figure, numeric characters at the uppermost row are dependent on data obtained from the clock 10, characters at the second row are from the memory 11 for receivng person display data, numeric characters at the lowermost row are from the received sheet number count register 13, and other characters, symbols, blank and the like are from the memory 12 for fixed data.

Figure 5A:
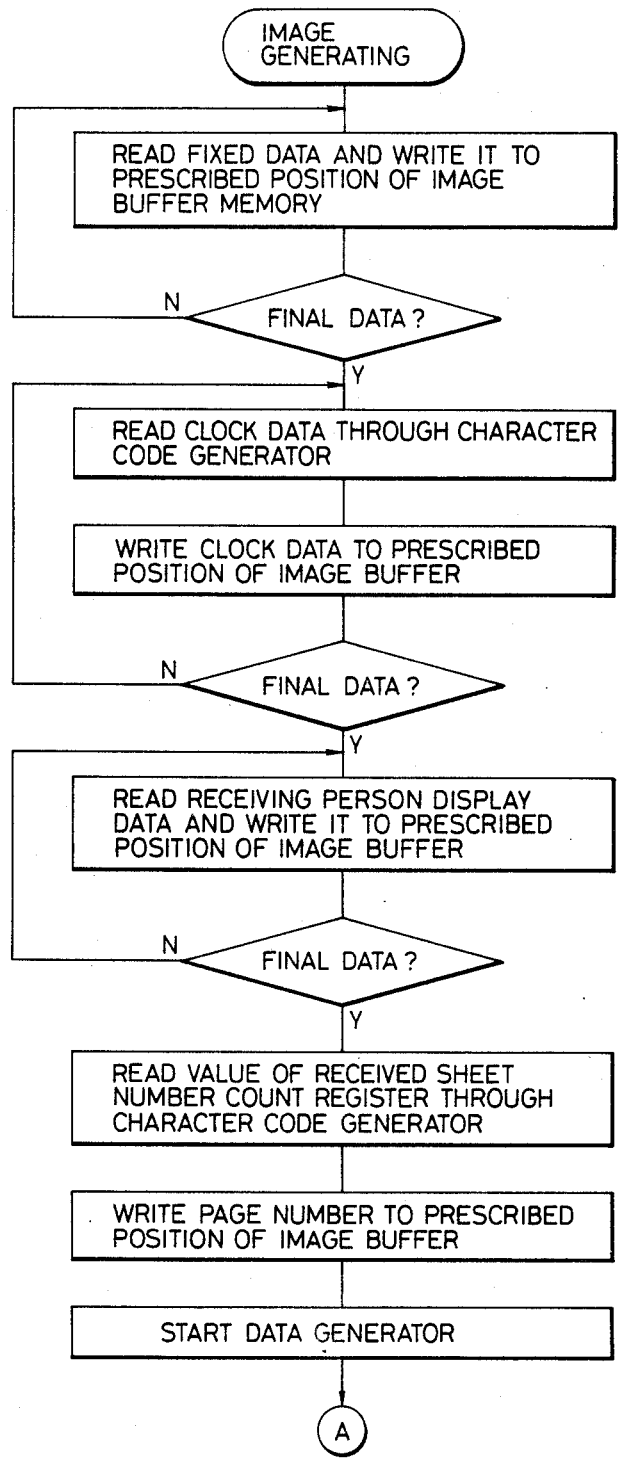
FIGS. 5a, 5b are flow charts illustrating action of the embodiment.
Figure 5B:
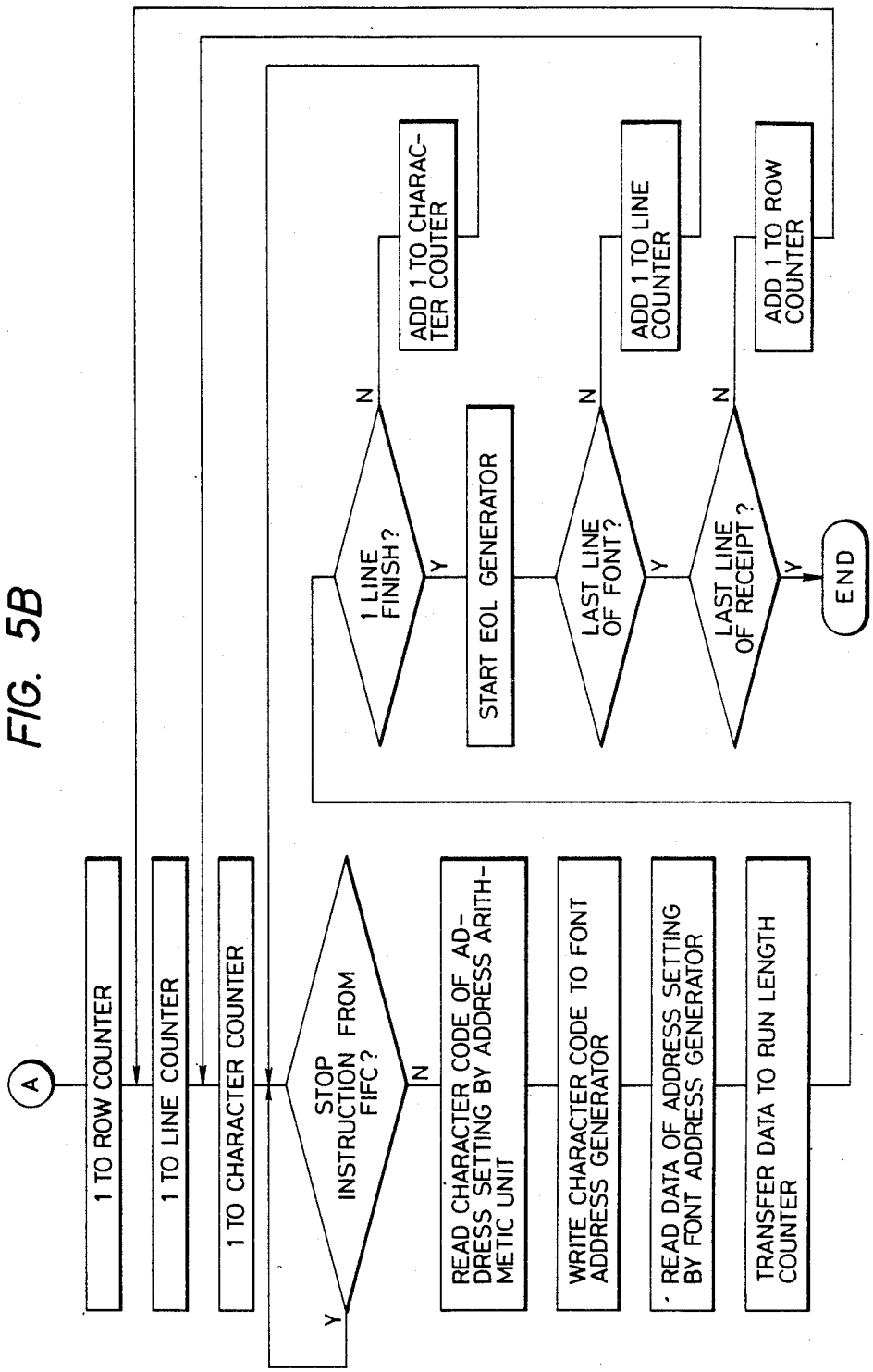

FIG. 5a and FIG. 5b are flow charts illustrating action of the device as shown in FIG. 2.

Next, an example of a device for receiving the receipt information in the transmitter T will be described. The transmitter T means an apparatus for transmitting picture information of the original document, and is really provided with system for the transmission, and also system for receiving the picture information transmitted from other facsimile.

Figure 6:
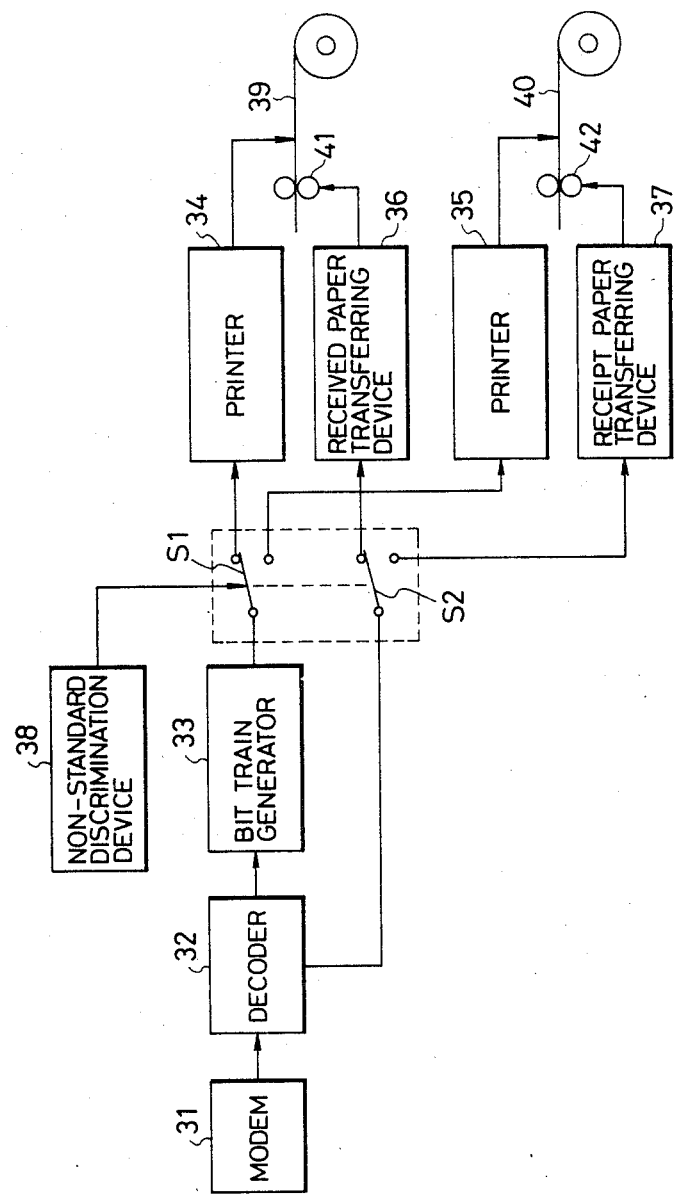
FIG. 6 and FIG. 7 are block diagrams illustrating receiving system of receipt information in the transmitter.

In FIG. 6, reference numeral 31 designates a modem for demodulating the received picture information, numeral 32 a decoder for converting the code of run length into signal train showing white or black, and numeral 33 a bit train generator for converting the signal train into a number of picture element data. Output of the bit train generator 33 is connected through a first change-over switch 51 to a printer 34 for picture information or a printer 35 for receipt information, and other output of the decoder 32 is connected through a second change-over switch S2 to a received paper transferring device 36 or a receipt paper transferring device 37. Both switches S1, S2 are changed in synchronization by a non-standard discrimination device 38 so that when the first change-over switch S1 is connected to the printer 34 for picture information the second change-over switch S2 is connected to the printer 35 for receipt. The received paper transferring device 36 and the receipt paper transferring device 37 transfer a received paper 39 or a receipt paper 40 by driving feed rollers 41, 42 respectively based on the line end signal (EOL).

When usual picture information is received, the non-standard discrimination device 38 does not act but the switches S1, S2 are connected to the printer 34 for picture information and the received paper transferring device 36 as shown in the figure, and the received picture information is recorded on the received paper 39 by the printer 34. When the communication of picture information is finished and the non-standard device instruction (NSC) is transferred or when the non-standard device setting (NSS) is received, the non-standard discrimination device detects such instruction as soon as received thereby the switches S1, S2 are changed to side of the printer 35 for receipt and the receipt paper transferring device 37. Consequently the receipt information is recorded on the receipt paper 40 being ready for the receipt preparing.

Although FIG. 6 discloses an example where the received paper 39 for recording usual picture information and the receipt paper 40 for receipt preparing are provided separately, when the receipt information is recorded on the received paper, the non-standard discrimination device 38, the switches S1, S2, the printer 35 for receipt, the receipt paper transferring device 37 and the receipt 40 may be removed, and the bit train generator 33 may be connected directly to the printer 34 for picture information and also the detector 32 to the receipt paper transferring device 36.

Figure 7:
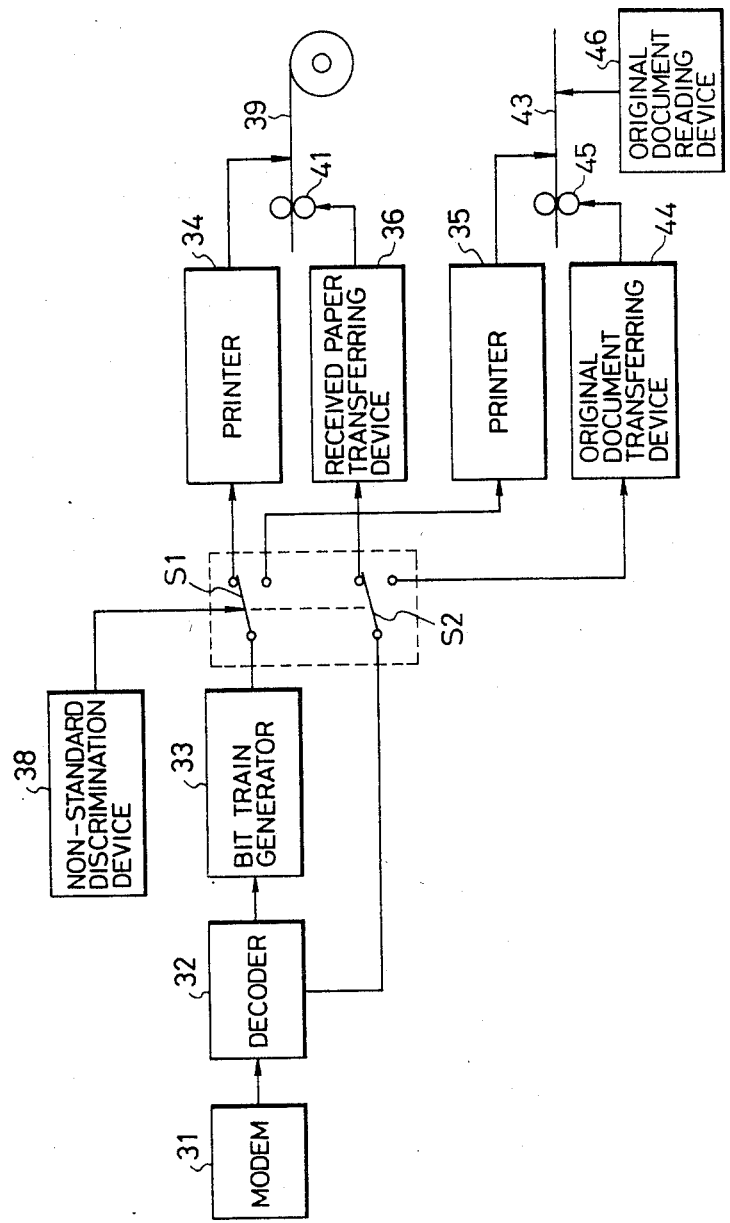

FIG. 7 shows another example where the printer 35 for receipt is disposed adjacent to the rear surface of a transmitted original document 43, and the original document 43 is transferred by driving an original document transferring device 44. This example is similar to FIG. 6 in other constitution. According to the apparatus of FIG. 7, after picture information of the original document 43 is read and transmitted by an original document reading device 46 being known, receipt information relating to the original document 43 may be recorded directly on rear surface of the original document 43.

Next, description will be performed regarding a device for changing state of requesting receipt information relating to original document and state of not requesting it when the original document is transmitted by the transmitter T.

A device shown in FIG. 8 is installed to the transmitter T, and numeral S3 designates a switch of automatic reset, which is turned on when requesting state and non-requesting state of receipt are changed. Numeral 48 designates a flipflop for inverting output every time the switch S3 is turned on, and a switch discrimination device 49 sets output content of a post message generator 50 corresponding to output of the flipflop 48. Numeral 51 designates a modem for post message transmission, numeral 52 a picture information transmitter, and numeral 53 a modem for picture information transmission. The post message means procedure end signal (EOP), message end signal (EOM) and multi page signal (MPS), which are communicated between the transmitter and the receiver after picture information corresponding to one sheet of the original document. When output of the flipflop 48 is turned on by means of the switch S3, the switch discrimination device 49 sets the post message generator 50 to ready state for transferring the message end signal (EOM). When the picture information transmitter 52 finishes the picture information transmission corresponding to the original document of all sheets, the message end signal (EOM) is generated and receiving of the receipt information is started according to the procedure described referring to FIG. 2. If content of the picture information transmitted from the picture information transmitter 52 through the modem 53 is of property not to require the receipt preparation, output of the flipflop 48 is inverted by turning on the switch S3, and the switch discrimination device 49 releases the post image generator 50 from ready state of transmitting the message end signal (EOM) and sets it to ready state of transmitting the procedure end signal (EOM). Accordingly, the procedure end signal is generated through the modem 51 at the end of picture information transmission and the communication is finished at receiving the message confirmation signal (MCF) from the receiver R without the receiving procedure of the receipt information.

The switch S3 may be a switch of manual reset and the flipflop 48 be omitted. A switch for requesting the receipt and a switch for not requesting it may be provided separately so that when one is turned on the other is turned off.

What is claimed is:

1. A facsimile receiver for receiving picture information from a transmitter, said receiver comprising:
    (a) means for storing receiving person display data identifying said receiver;
    (b) a received sheet number counter for counting the number of received sheets of said picture information;
    (c) a clock for measuring the receiving time;
    (d) a character generator for reading the content of said means for storing receiving person display data, said received sheet number counter and said clock at the end of receiving said picture information and generating a character pattern signal corresponding to said content; and
    (e) transmitting means for encoding and modulating said character pattern signal and transferring said character pattern signal to said transmitter.

2. A facsimile receiver for receiving information from a transmitter, said receiver comprising:
    counter means for counting the amount of said information received from said transmitter;
    clock means for identifying when said information is received from said transmitter;
    a character generator for reading the content of said counter means and said clock means and generating a character pattern signal in response to said content;
    transmitting means for encoding and modulating said character pattern signal and transmitting said character pattern signal to said transmitter.

3. A device as in claim 2 further comprising:
    identification means for storing data identifying said receiver, said character generator being capable of reading the content of said identification means and generating a character pattern signal in response to said content.

* * * * *